(12) United States Patent
Frame et al.

(10) Patent No.: US 10,958,101 B2
(45) Date of Patent: Mar. 23, 2021

(54) METHODS AND APPARATUS INCORPORATING TOPOLOGY ERROR ESTIMATION FOR MANAGEMENT OF AN ELECTRIC POWER SYSTEM

(71) Applicant: Siemens Industry, Inc., Alpharetta, GA (US)

(72) Inventors: James G. Frame, Eagan, MN (US); Lei Fan, Minneapolis, MN (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 543 days.

(21) Appl. No.: 15/995,430

(22) Filed: Jun. 1, 2018

(65) Prior Publication Data

US 2019/0372391 A1    Dec. 5, 2019

(51) Int. Cl.
*H02J 13/00* (2006.01)
*G05B 13/02* (2006.01)
*G06Q 50/06* (2012.01)
*G06F 30/18* (2020.01)
*G06F 119/06* (2020.01)
*G05B 15/02* (2006.01)

(52) U.S. Cl.
CPC ...... *H02J 13/00034* (2020.01); *G05B 13/024* (2013.01); *H02J 13/00012* (2020.01); *H02J 13/00036* (2020.01); *H02J 13/0062* (2013.01); *H02J 13/0093* (2013.01); *G05B 15/02* (2013.01); *G06F 30/18* (2020.01); *G06F 2119/06* (2020.01); *G06Q 50/06* (2013.01)

(58) Field of Classification Search
CPC .... H02J 3/46; H02J 13/0062; H02J 13/00016; H02J 13/00034; H02J 13/00036; G05B 15/02; G05B 19/042; G05B 2219/2639; G05B 13/024; G05B 2219/24048; G05B 23/0294; G06F 2119/06; G06F 30/18; G01R 19/2513; G01R 31/086; G01R 21/00; G01R 35/00
See application file for complete search history.

(56) References Cited

U.S. PATENT DOCUMENTS

| 9,287,713 B2 | 3/2016 | Sharon et al. |
| 10,796,254 B2* | 10/2020 | Aganagic ............... G06Q 10/06 |
| 2014/0142909 A1* | 5/2014 | He ........................ G06F 30/367 703/2 |

OTHER PUBLICATIONS

Kun Zhu, "Power System State Estimation"; Royal Institute of Technology Lecture 15; May 2, 2013.
K. A. Clements and P. W. Davis / "Multiple Bad Data Detectability and Identifiability, a Geometric Approach"; Worcester Polytechnic Institute, Worcester, MA; 1985 Pica Conference Jul. 1986.

(Continued)

*Primary Examiner* — Amy He

(57) ABSTRACT

An electric power system includes an energy management system configured to control a generated power output level of one or more electric generator resources, and a configuration of two or more high-voltage transmission lines, for efficient operation based, at least in part, on a topology error estimation using binary values corresponding to switch statuses. Increased accuracy of network topology estimates facilitates improved state estimation, which in turn enables production of more highly optimized control of electric generator resources and configuration of high-voltage transmission lines.

20 Claims, 9 Drawing Sheets

(56) References Cited

OTHER PUBLICATIONS

N. Vempati, C. Silva, O. Alsaç, B. Stott / "Topology Estimation"; Date of Conference: 16-16 Jun. 2005; Date Added to IEEE Xplore: Aug. 1, 2005; Print ISBN: 0-7803-9157-8; Print ISSN: 1932-5517.

* cited by examiner

METHODS AND APPARATUS INCORPORATING TOPOLOGY ERROR ESTIMATION FOR MANAGEMENT OF AN ELECTRIC POWER SYSTEM

FIELD

The present disclosure relates to methods and apparatus for operating an electric power system, and more particularly to methods and apparatus incorporating topology error estimation for management of an electric power system.

BACKGROUND

An electric power system is a complex system-of-systems, including generation, transmission, and distribution subsystems, along with many institutions or entities involved in its planning, operation, and oversight.

Over time, the electric power system evolved from a configuration in which electric utilities operated as regulated monopolies, to today's configuration in which generation resources and transmission resources are operated in a regulated market environment. In this marketplace, electric power generation resources and electric power transmission resources are not necessarily owned and/or operated by a single market participant. In this market environment in which wholesale electricity is bought and sold, and delivered to customers over great distances, a number of government regulations, designed to ensure adequate supplies of electricity, and to maintain operational reliability of the electric power system, have been put into place.

To meet the regulations, a market planning and control mechanism can be implemented by an entity, such as, an independent system operator (ISO) or a regional transmission operator (RTO). An ISO is an entity that operates an electricity marketplace, and coordinates, controls, and monitors the operation of the electric power system within its designated territory. An RTO is similar to an ISO, but may have some additional responsibilities for transmission networks. For example, the United States and Canada have several ISO/RTO entities, each entity playing a role in the management and control of the electric power grid in its own respective territory. A map of North American ISOs and RTOs is maintained by the United States Federal Energy Regulatory Commission (FERC) at http://www.ferc.gov/industries/electric/indus-act/rto-elec-ovr-rto-map.pdf. Entities other than ISO/RTO entities, such as for example, utilities may also operate or control various portions the electric power grid.

To carry out their functions as electricity marketplace operators, and their coordination, control, and monitoring obligations, the ISOs/RTOs put energy management systems in place. Likewise, non-ISO/RTO entities may also use energy management systems. Energy management systems receive large amounts of data about the electric power grid, electric generation resources, transmission resources, weather forecasts, fuel costs, unplanned outages, requests for maintenance outages, bids to buy and/or sell electricity, and so on. In order to maintain the stability and reliability of an electric power system, the energy management systems of the ISOs/RTOs use such data to manage, or control, the output of the various electric generation resources, manage, or control, the configuration of the transmission resources, the schedule of maintenance outages, and so on. Because an electric power system is complex, accurate methods and apparatus for controlling it help the electric power system to operate efficiently and profitably.

SUMMARY

In some embodiments in accordance with this disclosure, a method of controlling an electric power system includes providing (1) a plurality of electric generator resources, where each electric generator resource is configured to operate in accordance with electric generator resource control data, (2) a plurality of transmission lines, where each transmission line is coupled to at least one electric generator resource, (3) a plurality of telemetered switching devices, where each telemetered switching device is coupled to at least one transmission line, (4) a plurality of non-telemetered switching devices, where each non-telemetered switching device is coupled to at least one transmission line, and (5) an energy management system coupled to the plurality of generator resources, the plurality of transmission lines, and at least one telemetered switching device. The method further includes generating a first network topology model of the electric power system, generating a first state estimation based, at least in part, on the first network topology model, generating a first topology error estimation based, at least in part, on the first state estimation wherein generating the first topology error estimation includes using a binary variable corresponding to a status of a telemetered or non-telemetered switching device, generating a second network topology model of the electric power system based, at least in part, on the first network topology model and the first topology error estimation, and generating a second state estimation of the electric power system based, at least in part, on the second network topology model. The method further provides determining an optimized schedule of power generation for one or more electric generator resources, based at least in part on the second state estimation, and determining an optimized configuration of one or more transmission lines, based at least in part on the second state estimation, generating electric generator resource control data based, at least in part, on the optimized schedule of power generation, and generating transmission line configuration control data based, at least in part, on the optimized configuration of one or more transmission lines. The method further provides managing a generated electric power output level of at least one electric generator resource based, at least in part, on the electric generator resource control data, and managing a configuration of one or more transmission lines based, at least in part, on the transmission line configuration control data.

In some embodiments in accordance with this disclosure, an electric power system is provided that includes (1) a plurality of electric generator resources, where each electric generator resource is configured to operate in accordance with electric generator resource control data, (2) a plurality of transmission lines, where each transmission line is coupled to at least one electric generator resource, (3) a plurality of telemetered switching devices, where each telemetered switching device is coupled to at least one transmission line of the plurality of transmission lines, (4) a plurality of non-telemetered switching devices, where each non-telemetered switching device is coupled to at least one transmission line of the plurality of transmission lines, and (5) an energy management system coupled to the plurality of generator resources, the plurality of transmission lines, and at least one telemetered switching device. The energy management system of the electric power system includes a processor, a memory, and a plurality of instructions stored in the memory that, when executed by the processor, cause the energy management system to: generate a first network topology model of the electric power system, generate a first state estimation of the electric power system based, at least in part, on the first network topology model, generate a first topology error estimation based, at least in part, on the first state estimation of the electric power system, generate a second network topology model of the electric power system based, at least in part, on the first network topology model and the first topology error estimation, generate a second state estimation of the electric power system based, at least in part, on the second network topology model, determine an optimized schedule of power generation for one or more electric generator resources, based at least in part on the second state estimation; determine an optimized configuration of one or more transmission lines, based at least in part on the second state estimation, generate electric generator resource control data based, at least in part, on the optimized schedule of power generation, generate transmission line configuration control data based, at least in part, on the optimized configuration of one or more transmission lines, manage a generated electric power output level of at least one electric generator resource based, at least in part, on the electric generator resource control data, manage a configuration of one or more transmission lines based, at least in part, on the transmission line configuration control data, wherein the instructions that, when executed by the processor cause the energy management system to generate a first topology estimation of the electric power system further cause the energy management system to include binary variables corresponding to a status of one or more of the telemetered or non-telemetered switches.

Still other aspects, features, and advantages of the present disclosure may be readily apparent from the following description by illustrating a number of example embodiments, including the best mode contemplated for carrying out the present disclosure. The present disclosure may also be capable of other and different embodiments, and its details may be modified in various respects, all without departing from the substance and scope of the present disclosure.

BRIEF DESCRIPTION OF THE DRAWINGS

The accompanying drawings, described below, are for illustrative purposes and are not necessarily drawn to scale. The drawings are not intended to limit the scope of the disclosure in any way. Like numerals are used throughout the specification and drawings to denote like elements.

DETAILED DESCRIPTION

Figure 1:
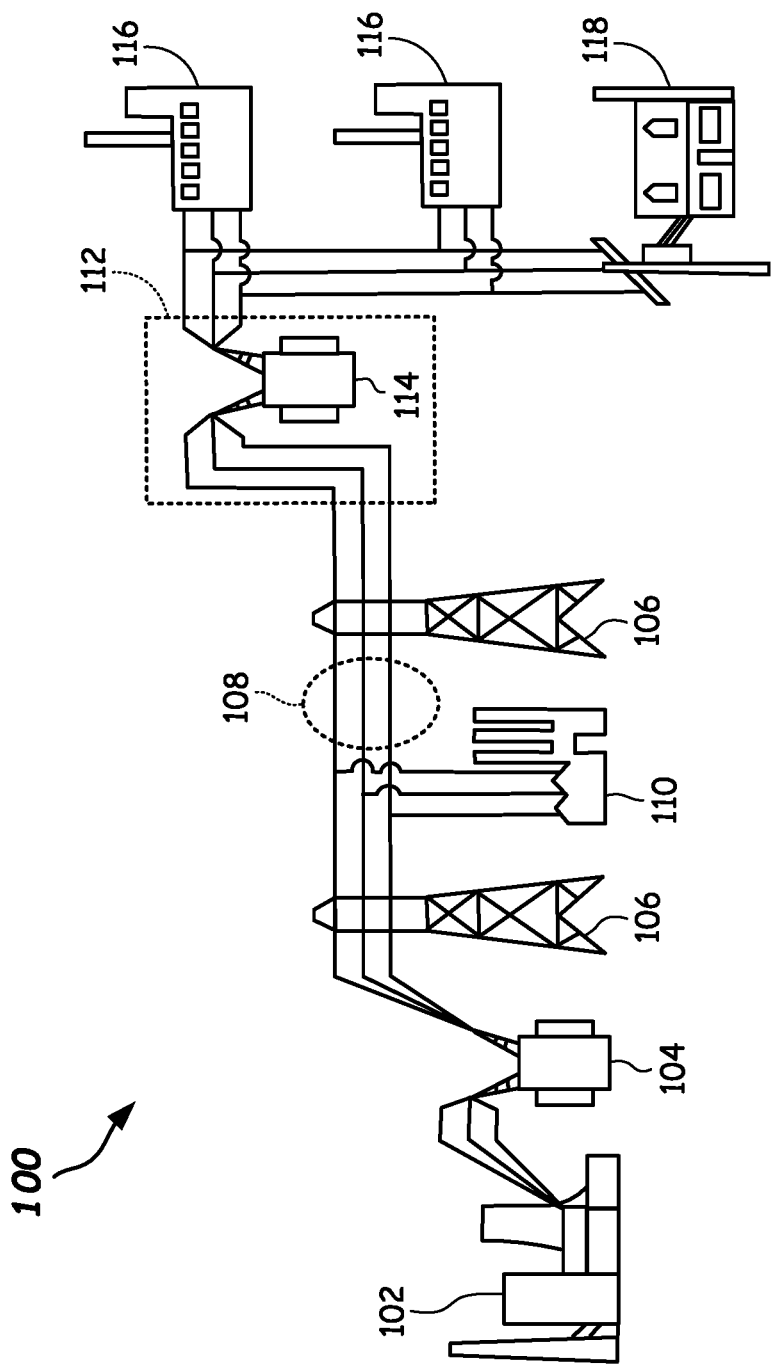
FIG. 1 illustrates an electric power system in accordance with embodiments of the present disclosure.

Reference will now be made in detail to the example embodiments of this disclosure, which are illustrated in the accompanying drawings. In describing the embodiments, numerous specific details are set forth in order to provide a thorough understanding of the disclosure. However, it will be apparent to a person of skill in the art that embodiments of the disclosure may be practiced without some or all of these specific details. In other instances, well-known features and/or process steps have not been described in detail so as not to obscure embodiments of the disclosure. Features of the various embodiments described herein may be combined with each other, unless specifically noted otherwise.

The materials, components, and assemblies described herein as making up the various embodiments are intended to be illustrative and not restrictive. Many suitable materials and components that can perform the same or a similar function as the materials and components described herein are intended to be embraced within the scope of embodiments of the present disclosure.

Various elements of a complex electric power system, operating in a regulated market environment, may be managed, or controlled, by ISOs/RTOs, which take many factors into account. ISOs/RTOs and similarly situated entities may use an energy management system to perform their respective management and control obligations with respect to the electric power system. Some of the factors taken into account by an energy management system include, but are not limited to data about the electric power grid, electric generation resources, electric transmission resources, distribution resources, real-time and predicted loads, line current, bus voltages, phase angles, real and reactive power, substation alarms, the open/closed status of circuit breakers and switches, weather forecasts, fuel costs, unplanned outages, requests for maintenance outages, and bids to buy and/or sell electricity.

An energy management system (EMS) may be a system of tools, including but not limited to computer-implemented tools, used by operators of electric utility grids to monitor, control, and optimize the performance of the generation and/or transmission of an energy delivery system. In other words, an EMS is used to optimize, supervise and control the transmission grid, generator assets, and in some cases, the loads. The monitoring and control functions are known as "supervisory control and data acquisition" (SCADA). Control of such a system may involve automatic control actions by the EMS to arrest deviations in power system frequency whenever imbalances arise between load and generation. The electric power system includes numerous sub-systems and involves significant complexity both in terms of the vast amount of real-time status information generated by the sub-systems and the sheer size of the electrical networks controlled which can include, for example, many thousands of nodes and several thousand generating units.

In determining how various elements of the electric power system are to be operated, it is known in the art that the state of the electric power system can be used by the energy management system to optimize the management and operation of the electric power system. However, because of the complexity of the electric power system, the complete state of system may not be known. In such a case, it is still helpful to have a state estimation. As explained in greater detail below, due to the complexity of the electric power system, obtaining an accurate state estimation may be difficult. The accuracy of the state estimation may depend on the accuracy of a network topology model of the electric power system.

Various embodiments in accordance with the present disclosure, provide methods, systems, and apparatus for improving the accuracy of the network topology model and the accuracy of a corresponding state estimation. In turn, the improved state estimate enables the energy management system to deliver a greater degree of optimization for managing and controlling resources of the electric power system.

An electric power system may include more than just electric generation resources, and electric transmission resources. By way of example, and not limitation, an electric power system may include step-up transformers, overhead and underground high-voltage transmission lines, substations, lightning arresters, surge arresters, high-voltage switching devices (including circuit breakers, switches, isolator switches, disconnect switches, disconnecting circuit breakers (i.e., integrated circuit breaker and disconnect switch combination) and earthing switches), motors for remote operation of high-voltage switching devices, and actuators for applying forces to various substation components. Although many switching devices are motorized, manually-operated switching devices may also be included in the electric power system. Further, by way of example, and not limitation, the electric power system may include fuses, air-core shunt reactors, energy storage units, step-down transformers, electric usage meters, sensors, measurement devices, remote terminal units (RTUs), and a communications network suitable for carrying at least telemetry data from various sensors and measurement devices to an EMS, and control data from the EMS to various controllable elements of the electric power system, to name some examples. Many of these items may be disposed in high-voltage substations. These examples, together with their interconnections, may be part of the topology of the electric power system.

FIG. 1 provides a high-level illustration of an example electric power system 100 including an electric generating resource 102, a step-up transformer 104, a plurality of high-voltage transmission line towers 106, high-voltage transmission lines 108, an industrial customer 110, a substation 112 including a step-down transformer 114, a plurality of commercial customers 116, and a residential customer 118. Electric generator resource 102 may be a power plant that produces electricity from burning of hydrocarbon fuels such as for example, coal, oil, and natural gas; or from nuclear, geothermal, or hydro-electric sources. Step-up transformer 104 is connected to an output of electric generating resource 102 and transforms that output to a higher voltage for long distance transmission. High-voltage overhead transmission lines 108 are supported by high-voltage transmission line towers 106. It is noted that, some electric power systems may also include high-voltage underground transmission lines. Substation 112 may include a variety of equipment including but not limited to one or more step-down transformers 114. Other types of equipment (not shown in FIG. 1) that may be installed in substation 112 include, but are not limited to, circuit breakers, switches, lightning arresters, shunt reactors, sensors, measurement devices, remote terminal units, and one or more communication interfaces. In operation, the one or more communication interfaces enable information from the substation to be sent to the EMS, and for control data to reach the equipment installed at the substation.

FIG. 1 illustrates the power generation and transmission portion of the electric power system, without showing the control and communication portions of electric power system 100.

Figure 2:
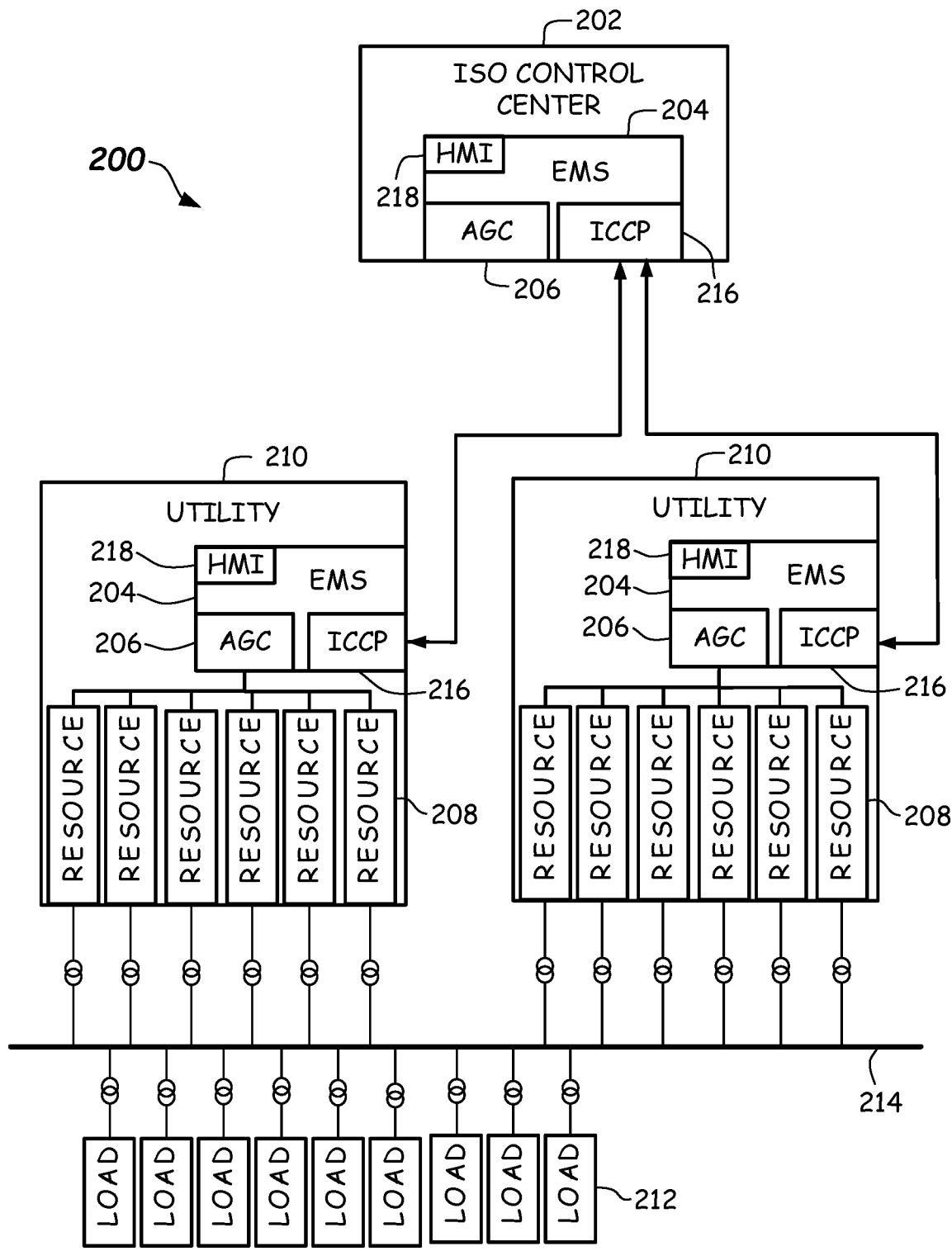
FIG. 2 illustrates a high-level block diagram of an example electric power system in accordance with embodiments of the present disclosure.

FIG. 2 illustrates a high-level block diagram of an example electric power system 200. In some embodiments, for example, Independent System Operators (ISO) 202 operate control centers that may include an EMS 204. EMS 204 may include a number of hardware or software components for monitoring, managing, controlling, and/or optimizing the performance (e.g., in terms of minimizing cost, maximizing efficiency, and maximizing reliability) of the generation and transmission of the electric power system 200.

EMS 204 may include an automatic generation control (AGC) system 206 for adjusting the power output of multiple resources 208 (e.g., generators) at different power plants (e.g., utilities 210, independent power producers (IPP) and/or non-utility generators (NUG), etc.), in response to changes in the load created by consumers of the electricity. The generated power is delivered from resources 208 to power consumers' loads 212 via transmission lines 214. Note that utilities 210 may include an EMS 204 with an AGC system 206. To facilitate communications and control between EMSs 204, EMSs 204 may also implement an inter-control center protocol (ICCP) 216. A human-machine interface (HMI) service 218 within EMSs 204 provides operator access to the data and control of the EMSs 204.

Since a power grid requires that generation and load closely balance moment by moment, frequent adjustments to the output of resources 208 are continuously made. The balance can be judged by measuring the system frequency; if system frequency is increasing, more power is being generated than used, and the generators in electric power system 200 are accelerating. If the system frequency is decreasing, more load is on electric power system 200 than the instantaneous generation can provide, and the generators in the system 200 are slowing down.

Where the grid has tie interconnections to adjacent control areas, AGC system 206 helps maintain the power interchanges over the tie lines at the scheduled levels. With computer-based control systems and multiple inputs, an AGC system 206 can take into account such matters as the most economical units to adjust, the coordination of thermal, hydroelectric, wind, and other generation types, and constraints related to the stability of the system and capacity of interconnections to other power grids.

Figure 3:
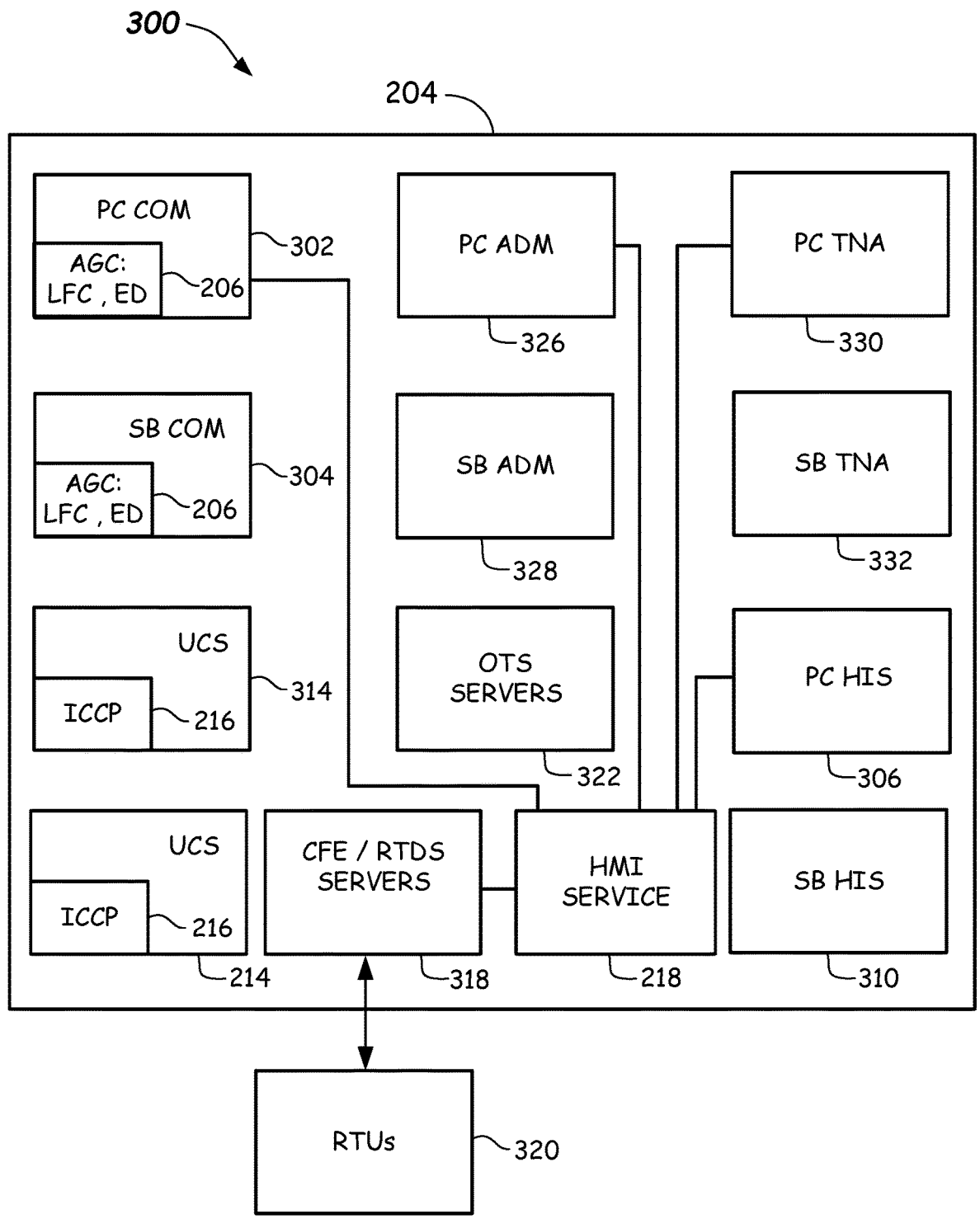
FIG. 3 illustrates a high-level block diagram of an example configuration of an energy management system in accordance with embodiments of the present disclosure.

Referring to FIG. 3, an example configuration of a portion of an electric power system 300, includes an EMS 204 includes AGC system 206 which may be implemented within a Process Controller (PC) server 302 that may also include Communicator (COM) functionality. AGC system 206 may include a Load Frequency Control (LFC) module, and an Economic Dispatch (ED) module. EMS 204 may include one or more back-up servers to provide higher reliability and fault-tolerance. Thus, a Standby (SB) server 304 with COM functionality is also provided in some embodiments. A PC server 306 that implements a Historical Information System (HIS) and a SB server 310 that implements a backup HIS may also be included in EMS 204.

EMS 204 may further include one or more Utility Communication Servers 314 that each provide an implementation of an Inter-Control Center Communication Protocol (ICCP) 216 that provides communication with, for example, other EMSs in operation at, for example, several utilities 210 (FIG. 2). In some embodiments, ICCP 216 may be used to implement remote control of resources 208 (FIG. 2) by implementing AGC system 206 communications between different EMSs. EMS 204 also includes a communication front end (CFE)/Real Time Data Server (RTDS) 318 to facilitate communications with external entities and users via remote terminal units (RTUs) 320. Note that RTUs 320 are part of the power utilities' field devices. In some embodiments, EMS 204 can also include a number of additional servers and applications. For example, EMS 204 may include Operator Training Simulator (OTS) servers 322, a PC Administration (ADM) application server 326, a SB ADM application server 328, a PC Transmission Network Application (TNA) 330, and a SB TNA 332. In some embodiments, topology error estimation is performed by TNA 330.

In operation, the ISO clears the real time market through its market optimization engine and then ISOs dispatch instructions along with ancillary service awards (e.g., regulation, reserves, etc.) to individual power utilities through a transport mechanism (e.g., ICCP 216). The power utilities receive dispatch instructions (e.g., via ICCP 216) and then make use of their AGC system 206 to compute a power setpoint command for each AGC cycle for the resources under AGC control. Next, the setpoints are updated to SCADA and they are then sent to the utilities' RTUs 320 via CFE/RTDS 318. There may be dedicated RTU lines that connect the RTUs to the CFE/RTDS 318. In various embodiments communications with the RTUs may be wired, wireless, or a combination of wired and wireless. In some embodiments RTU communication may be by way of the Internet. RTUs can be geographically located in the utilities' substations, and may be hardwired to the utilities' resources. The various applications such as, for example, AGC system 206, SCADA, CFE/RTDS 318, and ICCP 216 are part of EMS 204. RTUs 320 are field devices capable of sending telemetry to EMS 204, and may also receive megawatt (MW) setpoints from EMS 204 to control resources.

Figure 4:
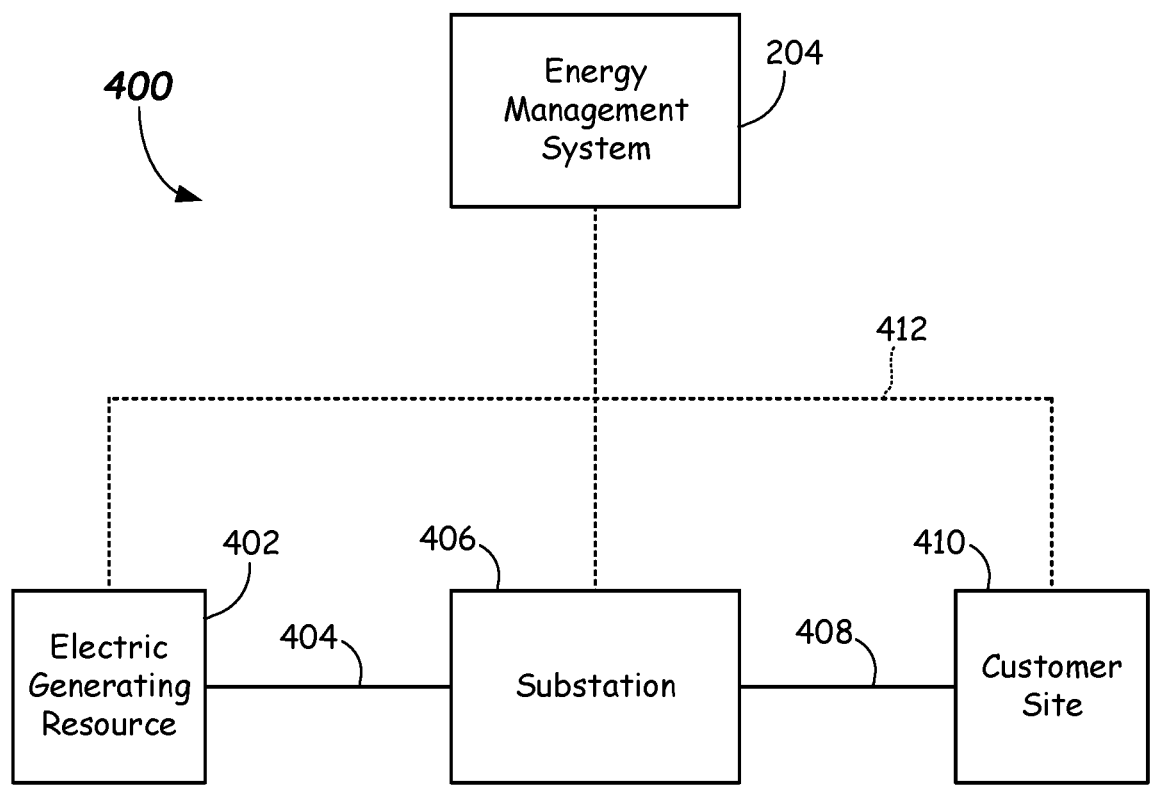
FIG. 4 illustrates a high-level block diagram of another electric power system in accordance with embodiments of the present disclosure.

FIG. 4 illustrates a simplified high-level block diagram of an example electric power system 400. Electric power system 400 includes an energy management system 204, an electric generating resource 402, a high-voltage transmission line 404 coupled to electric generating resource 402, a substation 406 coupled to high-voltage transmission line 404, a distribution line 408 coupled to substation 406, and a customer site 410 coupled to distribution line 408. Electric power system 400 further includes communication network 412, which is coupled to energy management system 204, electric generating resource 402, substation 406, and customer site 410.

Figure 5:
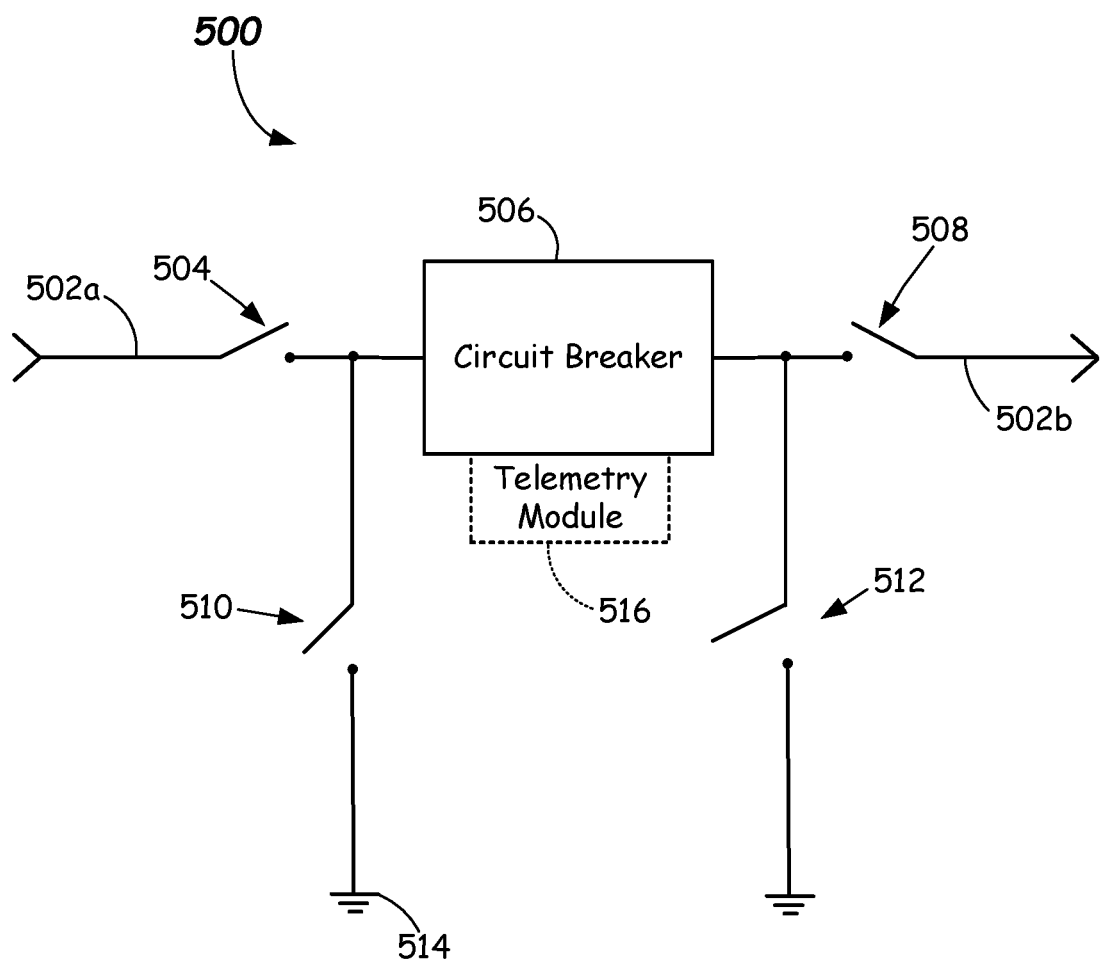
FIG. 5 illustrates a high-level block diagram of a circuit breaker, disconnect switches, and earthing switches suitable for use in an electric power system in accordance with embodiments of the present disclosure.

FIG. 5 illustrates a high-level block diagram of a portion of a substation 500, in an electric power system. Substation 500 includes a first high-voltage transmission line 502a, a first disconnector switch 504, a circuit breaker 506, a second disconnector switch 508, a second high-voltage transmission line 502b, a first earthing switch 510, and a second earthing switch 512. Circuit breaker 506 is configured to provide a closed state in which current may flow between first high-voltage transmission line 502a and second high-voltage transmission line 502b; and further configured to provide an open state in which current may not flow between first high-voltage transmission line 502a and second high-voltage transmission line 502b. In some embodiments, the state of circuit breaker 506 is observable by the energy management system 204, and in various other embodiments the state of circuit breaker 506 is not observable. In various embodiments in accordance with the present disclosure, an electric power system includes a plurality of circuit breakers, in which the states of some circuit breakers are observable, and the states of other circuit breakers are not observable.

Still referring to FIG. 5, a first disconnector switch 504, shown in the open state, is configured to provide a closed state in which high-voltage transmission line 502a is coupled to circuit breaker 506; and further configured to provide an open state in which high-voltage transmission line 502a is not coupled to circuit breaker 506. Similarly, a second disconnector switch 508, shown in the open state, is configured to provide a closed state in which high-voltage transmission line 502b is coupled to circuit breaker 506; and further configured to provide an open state in which high-voltage transmission line 502b is not coupled to circuit breaker 506. In some embodiments, the state of first disconnector switch 504 may be observable (by EMS 204), and in other embodiments that state might not be observable. Likewise, in some embodiments, the state of second disconnector switch 508 may be observable (by EMS 204), and in other embodiments that state might not be observable. Earthing switches 510, 512, shown in the open position, are configured to connect circuit breaker 506 to earth ground 514. When circuit breaker 506 requires maintenance, it is placed into the open state, disconnect switches are 504, 508 are then placed into the open state, and earthing switches 510, 512 are then placed into the closed state. In this way, circuit breaker 506 is isolated from transmission lines 502a, 502b, and any residual charge in circuit breaker 506 is discharged to earth ground 514.

Still referring to FIG. 5, an optional telemetry module 516 is shown (in dashed lines) being associated with circuit breaker 506. As noted above, some circuit breakers may be telemetered and other circuit breakers may be without a telemetry module. Telemetry module 516 is configured to sense, measure, or derive information about a device with which it is associated, in this case, circuit breaker 506. Telemetry module 516 is configured to provide such information to an energy management system. For example, telemetry module 516 may determine whether circuit breaker 506 is the open state or the closed state and report this information to the energy management system (e.g., EMS 204). A telemetry module, such as telemetry module 516, may be associated with various pieces of equipment in the electric power system where sensed, derived, or measured parameters such as voltage, phase, current, temperature, and switch position, to name a few examples, are useful to the management and control of the electric power system. In some embodiments, telemetry module 516 may be configured to receive control data, directly or indirectly, from an energy management system, to provide one or more control signals to operate equipment such as switches or motors, to name a few examples.

Figure 6:
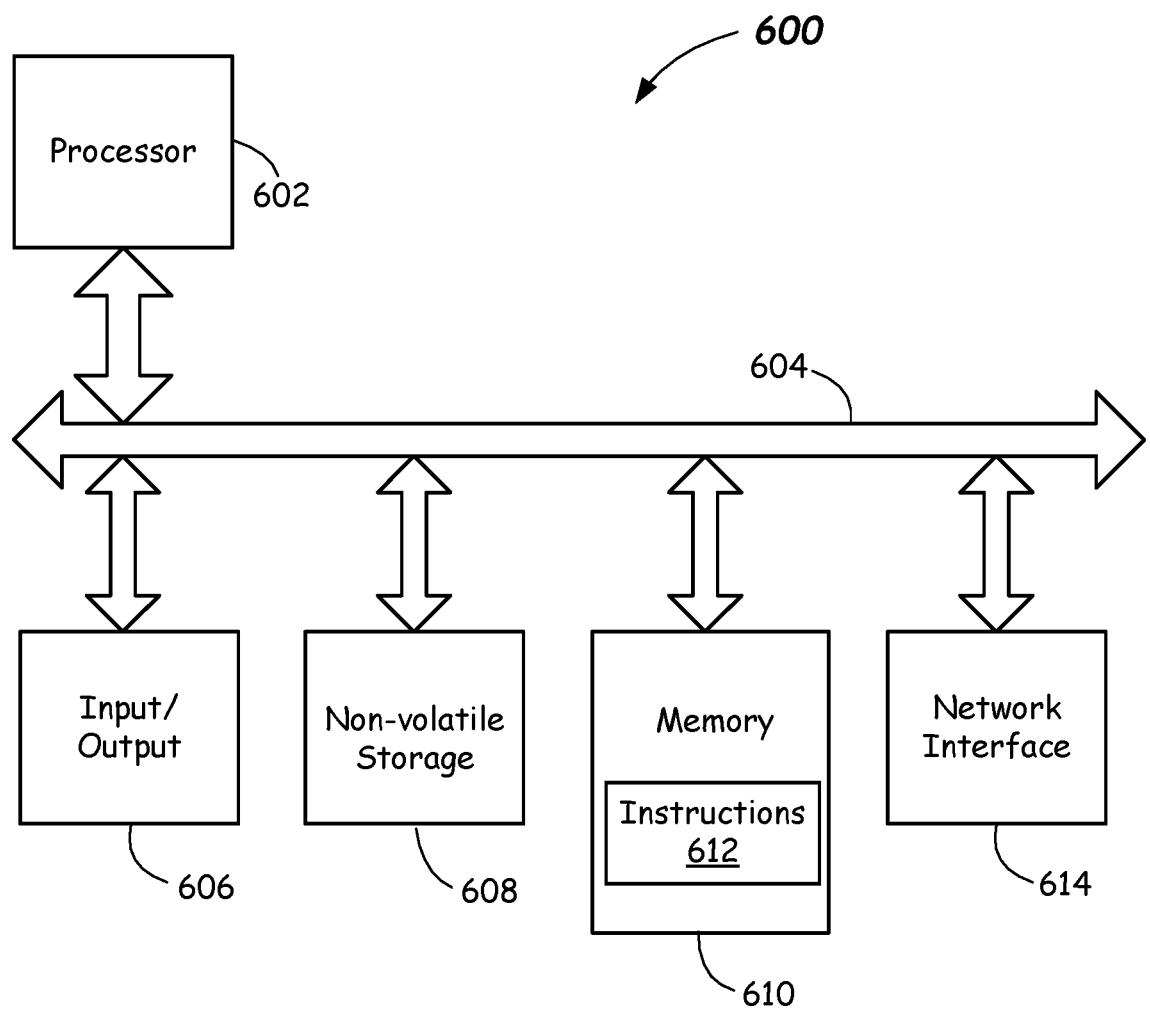
FIG. 6 illustrates a high-level block diagram of an example process controller suitable for use in an energy management system in accordance with embodiments of the present disclosure.

Referring to FIG. 6, an example process controller (PC) 600 in accordance with embodiments of the present disclosure is provided. Process controller 600 includes a processor 602 coupled to a bus 604, an input/output subsystem 606 coupled to bus 604, a non-volatile storage unit 608 coupled to bus 604, a memory 610 having instructions 612 stored therein coupled bus 604, and a network interface 614 coupled to bus 604. Processor 602 of example process controller 600 may fetch instructions 612 from memory 610, and execute instructions 612. The structure and operation of the electronic hardware components of a computer system such as process controller 600 are very well known and not described in greater detail herein.

As noted above, generating and providing control data to manage and control the resources, elements, and interconnections of an electric power system may be performed by an energy management system. In various embodiments, generating and providing the control data may include analysis and optimization. Various optimizations performed by the energy management system, to control at least the generating and transmission resources of the electric power system, include performing a state estimation. A state estimator, which may be implemented in hardware, software, or a combination of hardware and software, provides a state estimation for use by various analysis and optimization modules of an energy management system. The concept of performing state estimation for an electric power system was initially applied to transmission networks to estimate node voltages, generator power outputs, load demands, and branch power and current flows at a given point in time based on real-time telemetered measurements. One factor that influences the quality of the state estimation is the degree to which the topology of the electric power system is known. Errors in the topology result in errors in the state estimation.

When performing a state estimation in electric power systems there is an assumption that the topology of the system is known. This essentially means the position of each switch in the electric power system is known accurately. Following the estimation of the state of the system, a bad data detection and identification analysis may be performed to identify the presence of bad data (i.e., statistically inconsistent data obtained from measurements of various electric power system components). Once the bad data is identified, the measurements producing that bad data may be ignored and the state estimation process may be performed again to produce a more accurate state estimation.

In electric power system topology estimation, there may be circumstances in which at least some of the switch positions in the electric power system are not accurately known. One example scenario in which a switch position is not accurately known may be where a telemetered switch position is inaccurate. Another example scenario in which a switch position is not accurately known may be due to mapping a digital telemetry value to a wrong switch. A further example scenario in which a switch position is not accurately known may be when there is no telemetry for a particular switch, and the default value of that particular switch is inaccurate. A still further example scenario in which a switch position is not accurately known may arise in maintenance conditions where a non-telemetered disconnection switch is open for maintenance, but a corresponding circuit breaker is telemetered and is in the closed position. In this scenario the state estimation would take the state of the circuit breaker as closed, but from a topology point-of-view it would be better to treat the circuit breaker as being open, because the non-telemetered disconnection switch being open, effectively means that no current flows through the circuit breaker even though its telemetered state is closed.

In these example scenarios, it is possible that the topology in the vicinity of these switches may be incorrect. This may have at least two effects on the state estimation solution. A first effect may be that the estimated state in this vicinity is of poor quality. A second effect may be that analog measurements in this vicinity are incorrectly identified as being bad data, and hence removed from the state estimation solution (further degrading the state estimate).

These considerations lead to the desire for a way to identify errors in the topology of the electric power system. This may be referred to as topology error estimation.

If topology errors can be identified and corrected, then a more accurate state estimation, and a more accurate bad data identification, can be performed. Various embodiments in accordance with this disclosure provide methods and apparatus for performing topology error estimation.

In one approach, performing a topology error estimation includes, for areas of the electric power system where topology errors are suspected, expanding the network topology model of the electric power system into a hybrid model. Such a hybrid network topology model may include a combination of nodes, switches, buses, and branches, and the set of state variables may be extended to include flows through switches, and node voltages and angles for the expanded portion of the network topology model. For the switches that are in the hybrid network topology model, additional pseudo measurements, which reflect the telemetered, or possibly the expected, position of the switches, may be included. For example, in some embodiments, if the expected position of a switch is closed then a pseudo measurement is added to the measurement set. This measurement indicates that the node voltages and angles at the two ends of the switch are the same. If the expected position of the switch is open then, in some embodiments, a measurement is added that indicates the flow through the switch is zero.

With such a hybrid network topology model, a tree structure of related state estimation problems can be built where each node of the tree corresponds to a node where a subset of the switch positions are assumed to be known while the remaining switch positions are still to be determined. Two new nodes may be formed for an existing node where one node corresponds to a particular additional switch being assumed open and the other node assuming the switch is closed. In this fashion an entire tree can be built, a state estimation performed for each node, and the node that gives the minimum objective function chosen as the best estimate (including the corresponding set of switch positions).

The foregoing approach has a drawback in that there is a significant computational burden in solving for each node of the solution tree. Implementing a branch and bound algorithm that tries to reduce the number of nodes of the tree for which a state estimation solution needs to be performed may be one way of reducing this computational burden.

Various embodiments in accordance with the present disclosure employ binary variables that indicate the status of switch positions and may use these variables to form disjoint sets of constraints that correspond to the various combination of switch positions. In this way, a mixed integer programming problem may be formulated and solved. The following formulation includes binary variables corresponding to the status of switches that are represented in a hybrid node/switch/bus/branch model in accordance with the present disclosure.

Example Topology Estimation Formulation

In one example embodiment, a topology estimation formulation may be as follows:

Minimize: $J(r) = \tfrac{1}{2} r^T W r$

Subject to: $r = z - h(x)$ $c(x) = 0$ $d(x, y) \leq 0$ where
x is the nsv×1 vector of state variables namely $x^T = [\theta^T, v^T, Ps^T, Qs^T]$
$\theta^T$ is the n×1 vector of node/bus voltage angles
$v^T$ is the n×1 vector of node/bus voltage magnitudes
Ps is the ns×1 vector of MW flows through switches that are represented in a physical model
Qs is the ns×1 vector of MVAR flows through switches that are represented in a physical model
y is the ns×1 vector of binary variables that correspond to switches that are represented in a physical model $$y_s = \begin{cases} 1 & \text{if switch } s \text{ is closed} \\ 0 & \text{if switch } s \text{ is open} \end{cases}$$

z is the m×1 vector of measurements. This may be a set of measurements that has been augmented, in accordance with the present disclosure, with pseudo measurements corresponding to information about switch status positions. If a switch status is thought to be closed, (based on, for example, telemetered information) then a pseudo measurement may be added that corresponds to the bus angle difference between the two nodes of the switch being zero, along with another pseudo measurement that indicates the voltage magnitude difference between the two end nodes is zero. If the switch is thought to be open then two pseudo measurements may be added corresponding to both the MW and MVAR flow through the switch being zero. If the switch status is unknown then no pseudo measurements may be added.
r is the m×1 vector of residuals between the measurements and the estimated value of the measurements.

$$W = R_z^{-1} = \begin{bmatrix} \sigma_1^{-2} & \cdots & 0 \\ \vdots & \ddots & \vdots \\ 0 & \cdots & \sigma_m^{-2} \end{bmatrix}$$

Here W is a diagonal matrix whose elements are the measurement weights and $R_z$ is the measurement covariance matrix.
h(x) is the m×1 vector of (non-linear) functions that express the measurements in terms of the state variables. The binary variables do not appear in these functions.
c(x) is the nec×1 vector function of equality constraints. This may be two types of constraints. One is equality constraints corresponding to zero injection buses. The second is equality constraints that indicate that the sum of the flows into a node equals the sum of flows out of the node. This includes the flows through switches as well as the flow through the usual branches. These two types of equality constraints are essentially the same if individual nodes and buses are treated in the same manner. These equality constraints are non-linear. These equality constraints do not depend on the binary variables for the same reason that h(x) does not.
d(x,y) is the nic×1 vector function of inequality constraints. This consists of four types of constraints for each switch as follows:

$$-y_s M \leq Ps_s \leq y_s M$$

$$-y_s M \leq Qs_s \leq y_s M$$

$$-(1-y_s)M \leq (\theta_i - \theta_j) \leq (1-y_s)M$$

$$-(1-y_s)M \leq (v_i - v_j) \leq (1-y_s)M$$

These constraints can be understood in the following manner:
If the switch s is closed (i.e., $y_s = 1$) then
the first two constraints indicate that the MW and MVAR flow can be anything less than M. M is chosen as a number larger than any expected flow, but not large enough to create numerical problems. In some embodiments, the value of M may be about 3 to 6 times the MVA rating of the switch, if it is known, or about 3 to 6 times the sum of the MVA ratings for the branches that connect to the station where the switch resides, if the switch rating is not available; and
the last two constraints indicate that there should be no voltage magnitude or angle difference for the two end nodes of switch s.
If the switch s is open (i.e., $y_s = 0$) then
The first two constraints indicate that the MW and MVAR flow has to be zero; and
The last two constraints indicate that the voltage angle and magnitude differences can be anything between −M and +M where again M is a large value to allow any reasonable differences but not big enough to cause numerical problems. In some embodiments, a value of about 300 to 500 degrees may be used as the value of M for the angle difference inequality, and a value of about 2 to 5 per unit may be used for the voltage magnitude difference inequality constraint. It should be noted that the inequality constraints are also non-linear. This is because of the binary variables. In general binary variables make a problem "highly non-linear." Alternatively, the binary variables may be described as making the problem "discontinuous," rather than highly non-linear.

This problem as formulated is a mixed integer non-linear programming problem. In general this is a hard category of problems without any general purpose solvers commercially available for solving them. One approach to overcome the lack of general purpose solvers for the formulation above, is to approximate this problem by one that is simpler to solve and can be solved by commercially available solver packages. Another approach is to solve the formulation above in an iterative fashion such as successive mixed integer linear programming. Yet another approach is to implement an algorithm specifically for the formulation above. These approaches are described below.

Simplified Problem Approach

In some embodiments, approximating the AC system using the DC power flow approximations results in the constraints become linear. This problem is then very similar to the DC state estimator problem. The objective function is quadratic, and this problem then becomes a mixed integer quadratic programming problem. Commercially available solvers, e.g., "Cplex" and "Gurobi," may be employed to solve this type problem. ILOG Cplex Optimization Studio is available from IBM of Armonk, N.Y.; and Gurobi is available from Gurobi Optimization, Inc., of Houston, Tex.

In alternative embodiments, the quadratic objective function may be replaced by the least absolute value objective function, or a suitably similar objective function. This is essentially a piecewise linear objective function with the resulting problem becoming a mixed integer linear programming problem. This is a problem that is well suited for commercially available solvers such as Cplex or Gurobi.

In one example embodiment, a DC topology estimation formulation using a weighted least squares objective function may be as follows:

Minimize: $J(r) = \frac{1}{2} r^T W r$

Subject to: $r = z - h(x)$ $c(x) = 0$ $d(x,y) \leq 0$ where x is the nsv×1 vector of state variables namely $x^T = [\theta^T, Ps^T]$
$\theta^T$ is the n×1 vector of node/bus voltage angles
Ps is the ns×1 vector of MW flows through switches that are represented in the physical model
y is the ns×1 vector of binary variables that correspond to switches that are represented in the physical model $$y_s = \begin{cases} 1 & \text{if switch } s \text{ is closed} \\ 0 & \text{if switch } s \text{ is open} \end{cases}$$

z is the m×1 vector of measurements. This is the set of measurements corresponding to the MW flows on branches as well as MW injections. These measurements are augmented with pseudo measurements corresponding to information about the switch status positions. If a switch status is thought to be closed, then a pseudo measurement is added that corresponds to the bus angle difference between the two nodes of the switch being zero. If the switch is thought to be open, then pseudo measurements are added corresponding to the MW flow through the switch being zero. If the switch status is unknown then no pseudo measurements are added.
r is the m×1 vector of residuals between the measurements and the estimated value of the measurements
W is a diagonal matrix whose elements are the measurement weights
h(x) is the m×1 vector of (linear) functions that express the measurements in terms of the state variables. For example, the MW flow on a line k between buses k and m is written as $$Pbr_k = \frac{1}{x_{ij}} (\theta_i - \theta_j).$$

Note that as before the H functions do not depend on the binary variables.
c(x) is the nec×1 vector function of equality constraints. The equality constraints indicate that the sum of the MW flows into a node (or a bus) equals the sum of the MW flows out of the node (or bus). This includes the flows through switches as well as the flow through the usual branches. These equality constraints do not depend on the binary variables for the same reason that h(x) does not.
d(x,y) is the nic×1 vector function of inequality constraints. This consists of two constraints for each switch as follows:

$-y_s M \leq Ps_s \leq y_s M$ $-(1-y_s)M \leq (\theta_i - \theta_j) \leq (1-y_s)M$ These constraints can be understood in the following manner:
If the switch s is closed (i.e., $y_s = 1$) then
 the two constraints indicate that the MW flow can be anything less than M. M is chosen as a number larger than any expected flow, but not large enough to create numerical problems; and
 the last constraint indicates that there should be no voltage angle difference for the two end nodes of switch s.
If the switch s is open (i.e., $y_s = 0$) then
 The first constraint indicates that the MW flow has to be zero.
 The last constraint indicates the voltage angle differences can be anything between −M and +M where again M is a large value to allow any reasonable differences but not big enough to cause numerical problems.

This formulation results in a mixed integer quadratic programming (MIQP) problem. This type of problem can be solved using commercially available solvers, such as, but not limited to, Cplex or Gurobi. Note that the output of such a solution can be used directly, i.e., there is no need to run multiple iterations of Cplex or Gurobi. Cplex and Gurobi perform internal iterations, but no external iterations are required. The key results from this solution are the switch statuses. These would serve as the basis for the next full state estimation solution.

In another example embodiment, a topology estimation formulation using a weighted least absolute value objective function may be as follows:

$$J(r) = \frac{1}{2} \sum_{i=1}^{m} w_{ii} |r_i|$$

Converting a problem containing absolute value terms into a linear form may be accomplished by any of the well-known techniques for doing so. For example, in some embodiments, such converting may be performed by introducing two new variables into the formulation: one new variable for when $r_i \leq 0$ and a second new variable for when $r_i \geq 0$. Additional equality constraints may be added that indicate the original $r_i$ equals the sum of the two new variables. Additional inequality constraints may also be added that specify one of the two new variables to be zero.

This formulation results in a mixed integer linear programming problem. This type of problem can be solved by commercially available solvers such as Cplex or Gurobi. The key results from this solution are the switch statuses. The switch statuses resulting from the solution of the mixed integer linear programming problem serve as the basis for the next full state estimation solution.

The trade-offs between the weighted least squares objective function, and the weighted least absolute value objective function, are known from a state estimation perspective. The weighted least absolute value problem may be somewhat easier to solve then the weighted least squares problem.

Figure 7A:
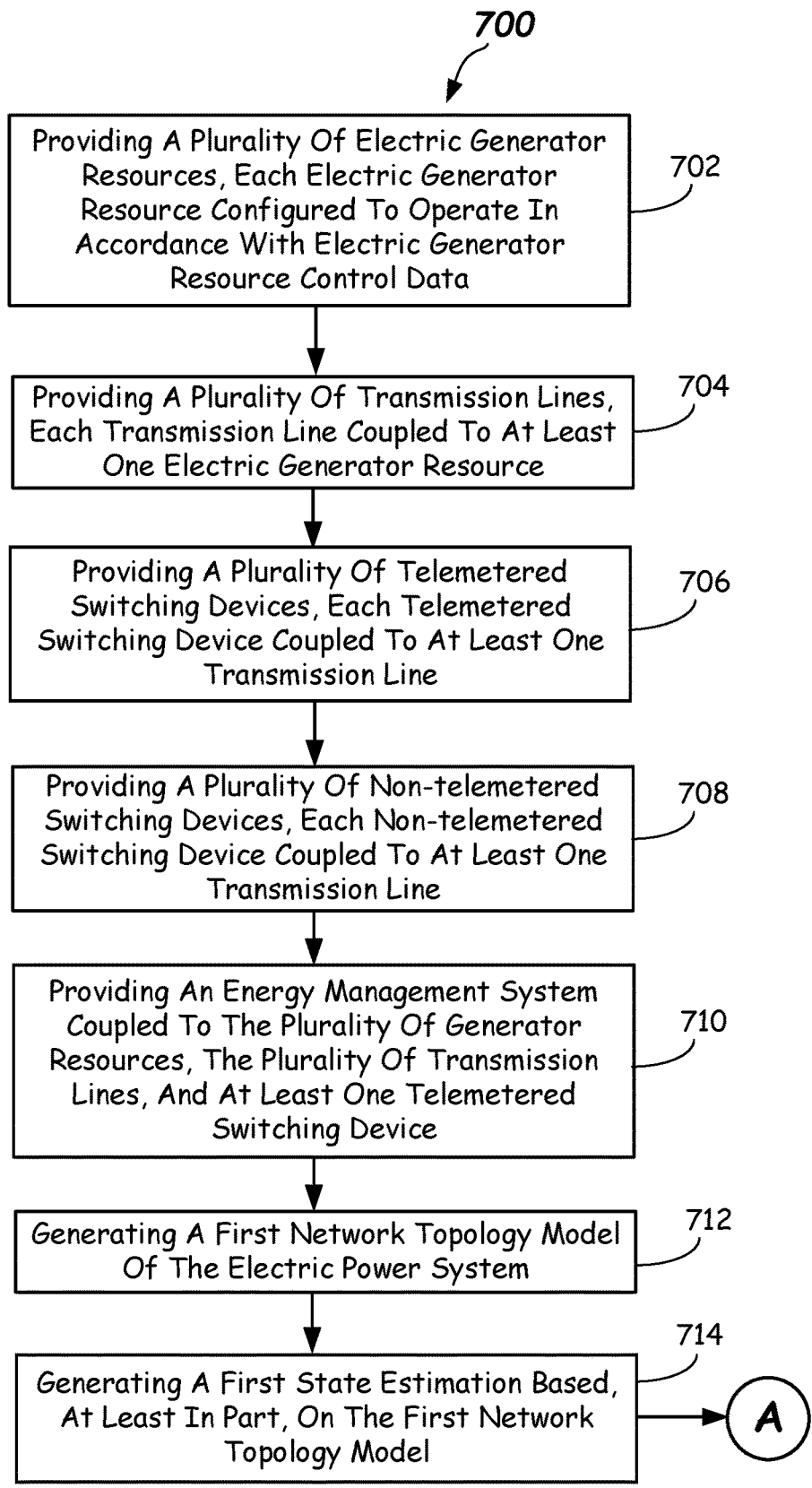
FIGS. 7A-7C illustrates a flow diagram of an example method of controlling an electric power system in accordance with embodiments of the present disclosure.
Figure 7B:
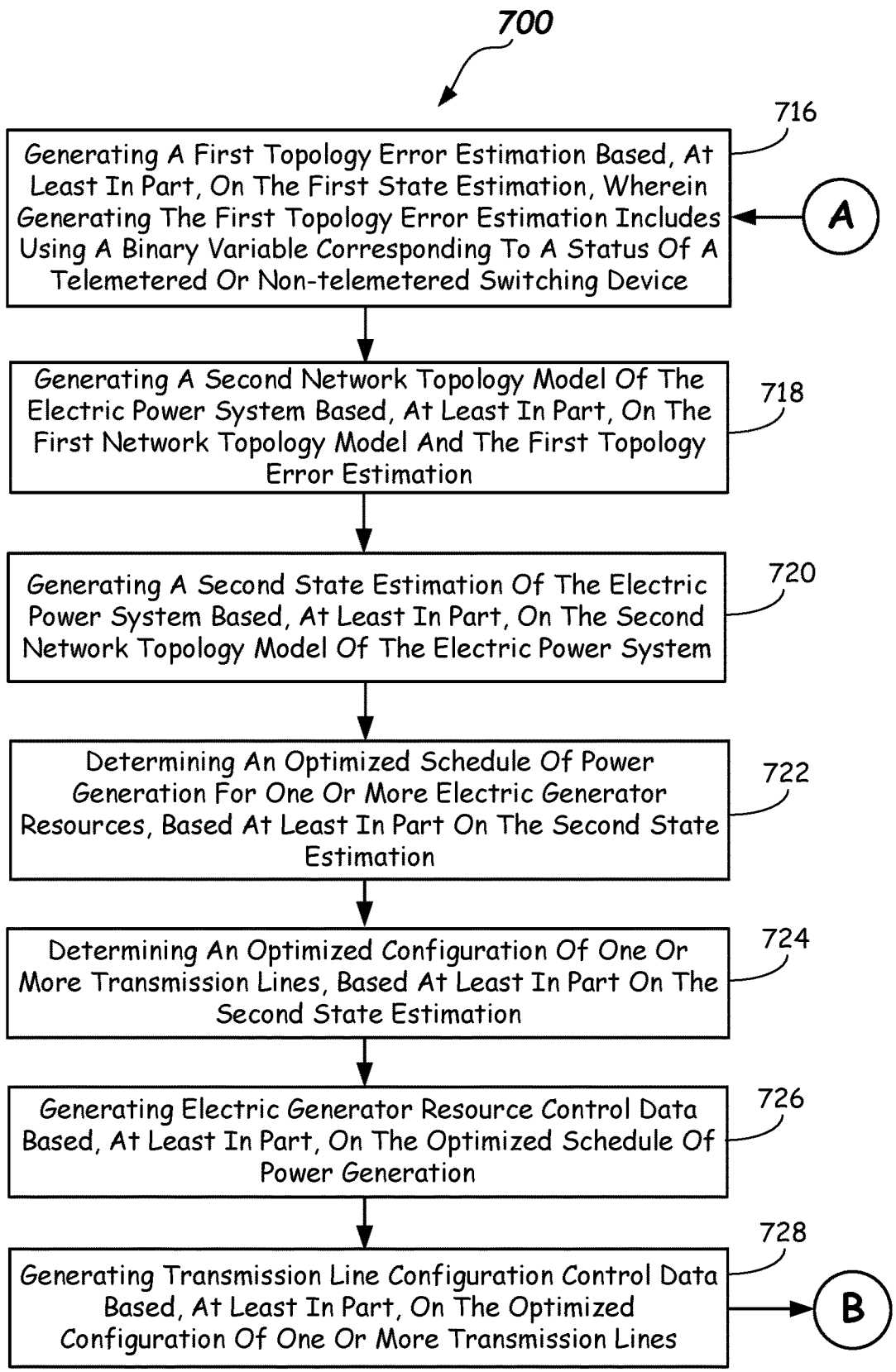
Figure 7C:
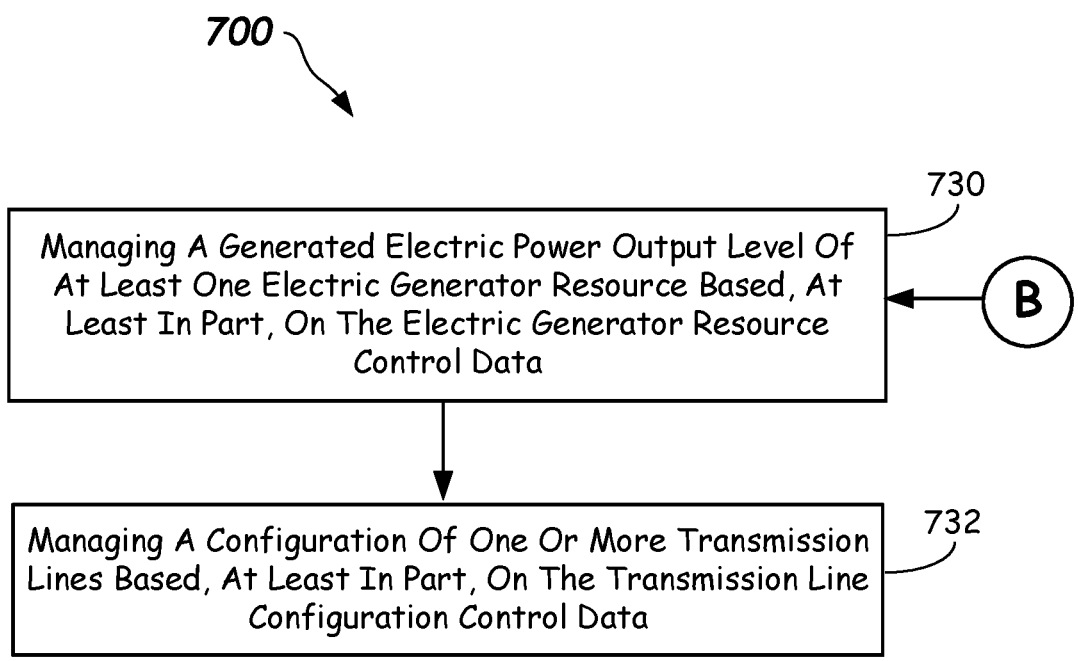

FIGS. 7A-7C illustrate an example method 700 of controlling an electric power system in accordance with embodiments of this disclosure. At a block 702, method 700 provides a plurality of electric generator resources, each electric generator resource configured to operate in accordance with electric generator resource control data. Method 700 further provides, at block 704, a plurality of transmission lines, each transmission line coupled to at least one electric generator resource, at block 706, a plurality of telemetered switching devices, each telemetered switching device coupled to at least one transmission line of the plurality of transmission lines, at block 708, a plurality of non-telemetered switching devices, each non-telemetered switching device coupled to at least one transmission line of the plurality of transmission lines, and at a block 710, an energy management system coupled to the plurality of generator resources, the plurality of transmission lines, and at least one telemetered switching device.

The electric generator resources may be, but are not limited to, electric generators driven by steam-powered turbines, or hydroelectric generators, to name a few examples. The transmission lines may be, but are not limited to, high-voltage transmission lines suitable for bulk electricity transmission. The energy management system may include portions that are implemented in hardware, software, or a combination of hardware and software such as a process controller executing stored instructions.

Method 700 further includes, at a block 712, generating a first network topology model of the electric power system. Generating the first network topology model may include, for example, acquiring (e.g., via the electric power system's SCADA) the status of at least a portion of the observable, or telemetered, switches and breakers in an electric power system, and calculating a network topology model based, at least in part, on the acquired statuses. Switch and breaker statuses may be obtained, for example, via an EMS querying of the telemetered switches and breakers, or by the self-reporting of telemetered switches and breakers to the EMS. At a block 714, a first state estimation is generated based, at least in part, on the first network topology model of the electric power system. State estimation for electric power systems has been known since it was first formulated as a weighted least-squares problem by Fred Schweppe in 1969, and still plays a central role in the management of electrical power systems today. Motivation for the use of state estimation is to perform computer-based analysis of an electric power system under conditions characterized by a current set of measurements. State estimation is a tool, commonly implemented in software, for providing voltage phasor magnitudes and angles for each of the buses in the network of the electric power system, based on the network topology and the available analog measurements of voltage, phase and current. At a block 716, a first topology error estimation is generated based, at least in part, on the first state estimation of the electric power system, wherein generating the first topology error estimation includes using a binary variable corresponding to a status of a telemetered or non-telemetered switching device. Since the complete network topology model may not be known accurately, and there may be errors in various analog measurements, the estimated state of the system may not match various measurements (i.e., various measurements may appear statistically inconsistent). In some embodiments, a weighted least squares formulation may be used to perform topology error estimation. In some alternative embodiments, a weighted least absolute value formulation may be used to perform topology error estimation. Other error estimation techniques may be used. At a block 718, a second network topology model of the electric power system is generated based, at least in part, on the first network topology model of the electric power system, the first state estimation, and the first topology error estimation. In this way, a more accurate network topology model may be produced, and in turn, provide a more accurate set of inputs to the state estimation.

Method 700 further includes, at a block 720, generating a second state estimation of the electric power system based, at least in part, on the second network topology model of the electric power system, at a block 722, determining an optimized schedule of power generation for one or more electric generator resources of the plurality of electric generator resources, based at least in part on the second state estimation, at a block 724, determining an optimized configuration of one or more transmission lines of the plurality of transmission lines, based at least in part on the second state estimation. Optimized generator schedules and transmission line configurations are produced by energy management systems in the normal course of their operation. This information may be presented to various other pieces of equipment in the electric power system to carry out the optimized behaviors determined by the energy management system. Control data that is used for controlling the output of electric generator resources, and for controlling the switch and breaker positions employed for configuring a network of transmission lines is provided by the energy management system to respective components of the electric power system. Method 700 further includes, at a block 726, generating electric generator resource control data based, at least in part, on the optimized schedule of power generation, and at a block 728, generating transmission line configuration control data based, at least in part, on the optimized configuration of one or more transmission lines.

Generating network topology models, topology error estimations, state estimations, optimized schedules and configurations, and control data may be performed by hardware, software, or a combination of hardware and software such as a process controller executing stored instructions.

Method 700 further includes, at a block 730, managing a generated electric power output level of at least one electric generator resource based, at least in part, on the electric generator resource control data, and at a block 732, managing a configuration of one or more transmission lines based, at least in part, on the transmission line configuration control data.

Once the electric generator resource control data has been generated, managing a generated electric power output level may include, for example, controlling generator speed in accordance with the electric generator resource control data. By way of example and not limitation, equilibrium between generation and demand may be maintained. Once the transmission line configuration control data has been generated, managing the configuration of transmission lines may include, but is not limited to physically changing switch positions to provide desired power flow networks.

Iterative Solution Approach

In some embodiments, the original non-linear problem may be solved using a successive linearization approach. With this approach the original mixed integer non-linear optimization problem may be approximated by an associated mixed integer quadratic programming (MIQP) problem. This approximate problem may be solved using commercially available solver software such as, for example, Cplex or Gurobi. Based on this solution a new approximation may be formed and solved. This process may repeat until the changes between iterations are small enough, i.e., below a predetermined threshold. In this way, an iterative solution in accordance with embodiments of the present disclosure using a successive mixed integer quadratic programming approach may be used to solve the topology estimation problem.

A mixed integer quadratic programming approach suitable for solving a topology estimation problem may include a sequence such as, for example:

a) forming a linear approximation to the non-linear constraints of the original problem, resulting in a mixed integer quadratic programming problem;

b) using a solver, such as but not limited to, commercially available solvers Cplex or Gurobi, to solve the MIQP;

c) forming a new MIQP approximation based on the previous solution;

d) solving the MIQP approximation from step (c);

e) stopping, if a maximum number of iterations has been reached;

f) stopping, if convergence has been obtained, i.e., changes between iterations are all below a predetermined threshold value; and g) returning to step (c).

This optimization problem may be formulated, at an iteration k, as follows:

Minimize: $J(r^k) = \frac{1}{2} r^{k^T} W r^k$

Subject to: $r^k = z^k - h^k(x^k)$ $c^k(x^k) = 0$ $d^k(x^k, y^k) \leq 0$ where $x^k$ is the nsv×1 vector of state variables at iteration k namely $x^{k^T} = [\theta^{k^T}, v^{k^T}, Ps^{k^T}, Qs^{k^T}]$ $\theta^k$ is the n×1 vector of node/bus voltage angles at iteration k;

$v^k$ is the n×1 vector of node/bus voltage magnitudes at iteration k;

$Ps^k$ is the ns×1 vector of MW flows through switches that are represented in the physical model at iteration k;

$Qs^k$ is the ns×1 vector of MVAR flows through switches that are represented in the physical model at iteration k;

$y^k$ is the ns×1 vector of binary variables that correspond to switches that are represented in the physical model at iteration k;

$z^k$ is the m×1 vector of measurements at iteration k. In some embodiments, the pseudo-measurements corresponding to the switch statuses may be recalculated for each iteration, since the switch statuses are calculated per iteration. In alternative embodiments, the original set of pseudo-measurements may be used for all iterations even though the switch statuses are being updated for each iteration;

$r^k$ is the m×1 vector of residuals between the measurements and the estimated value of the measurements for iteration k;

$h^k(x^k)$ is the m×1 vector of linear functions that express the measurements in terms of the state variables at iteration k;

$c^k(x^k)$ is the nec×1 vector of functions providing a linear approximation to the equality constraints; and $d(x^k, y^k)$ is the nic×1 vector function of inequality constraints.

Note that the inequality constraints d(x,y) are already linear functions of the state vector and the switch status binaries so no further transformation is required. This is the MIQP for this iteration.

The linearizations can be performed using Taylor's Series Expansions. This yields the following:

$$h^k(x^k) \cong h(x)\Big|_{x=x^{k-1}} + \frac{\partial h(x)}{\partial x}\Big|_{x=x^{k-1}} (x^k - x^{k-1})$$

$$c^k(x^k) \cong c(x)\Big|_{x=x^{k-1}} + \frac{\partial c(x)}{\partial x}\Big|_{x=x^{k-1}} (x^k - x^{k-1})$$

TERMINOLOGY

A switch or switching device is a device for making or breaking a current in an electric circuit.

SCADA is an acronym for Supervisory Control and Data Acquisition.

A substation is a part of an electrical power system, confined to a given area. A substation may include, but is not limited to the ends of transmission or distribution lines, electrical switches, control gear, buildings, transformers, measurement devices, communications devices and/or communication interfaces.

A high-voltage substation is a point in an electric power system where power may be pooled from generating sources, distributed, transformed, and delivered to load points. High-voltage substations may be interconnected with each other, so that the electric power system becomes a meshed network. This increases reliability of the power supply system by providing alternate paths for flow of power.

A disconnector, or isolator, is a mechanical switching device which, in the open position disconnects all the poles of an electric circuit. Disconnectors are used for no-load closing and opening operations, e.g., to isolate downstream devices so they can be worked on safely.

An earthing switch is a mechanical switching device for earthing parts of an electric circuit, capable of withstanding, for a specified duration, electric currents under abnormal conditions such as those of short circuit, but not required to carry electric current under normal conditions.

As used herein, "high voltage" refers to voltages used for bulk transmission of electricity.

As used herein, "fuse" refers to a protective device that, by the fusing of one or more of its specially designed and proportioned components, opens the circuit in which it is inserted by breaking the current when the current exceeds a given value for a particular period of time. The fuse comprises all the parts that form the complete device.

As used herein, "circuit breaker" refers to a mechanical switching device, capable of making, carrying and breaking currents under normal circuit conditions and also making, carrying for a specified time, and breaking currents under specified abnormal circuit conditions such as those of short circuit.

As used herein, "MW" refers to Mega Watt.

As used herein, "MVAR" refers to Mega Volt-Ampere Reactive.

A "processor" means any one or more microprocessors, one or more Central Processing Units (CPUs), one or more Graphics Processing Units (GPUs), one or more computing devices, one or more microcontrollers, one or more digital signal processors, one or more embedded processors such as an embedded processor in a System on Chip (SoC), one or more field programmable gate arrays (FPGAs), like devices, or various combinations of the foregoing.

While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

The term "computer-readable medium" refers to any statutory medium that participates in providing data (e.g., instructions) that may be read by a computer, a processor or a like device. Such a medium may take many forms, including but not limited to non-volatile media, volatile media, and specific types of transmission media. Non-volatile media include, for example, optical disks, magnetic disks, and other persistent memory. Volatile media include, but are not limited to, static random access memory (SRAM), and dynamic random access memory (DRAM). Types of transmission media include, for example, coaxial cables, electrically conductive wires, traces, or lines, including the wires, traces, or lines, that comprise a system bus coupled to the processor, and optical fibers. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a read-only memory (ROM), a random access memory (RAM), a programmable read-only memory (PROM), an electrically programmable read-only memory (EPROM), an electrically erasable programmable read-only memory (EEPROM), a flash memory (a type of EEPROM), a resistive memory, a filamentary memory, a metal oxide memory, a phase change memory, a spin transfer memory, a USB memory stick, any other memory chip or cartridge, or any other medium from which a computer, or processor, can access the data or instructions stored therein. The terms "computer-readable memory" and/or "tangible media" specifically exclude signals, waves, and wave forms or other intangible or transitory media that may nevertheless be readable by a computer.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a smartphone" does not imply that any or all of the three items of that list are mutually exclusive and does not imply that any or all of the three items of that list are comprehensive of any category.

Although the terms first, second, etc., may be used herein to describe various elements, components, regions, parts or sections, these elements, components, regions, parts or sections, should not be limited by these terms. The terms may be used to distinguish one element, component, region, part or section, from another element, component, region, part or section. For example, a first element, component, region, part or section discussed above could be termed a second element, component, region, part or section without departing from the teachings of the present disclosure.

As used herein, "or" is meant as an inclusive or, and not as an exclusive or. That is, as used herein, A or B, is meant to include A alone, B alone, and A and B together. In the case where A alone, B alone, and not A and B together, is meant to be expressed, this will be explicitly stated.

While embodiments of this disclosure have been disclosed in example forms, many modifications, additions, and deletions can be made therein without departing from the scope of this disclosure, as set forth in the subjoined claims and their equivalents.

What is claimed is:

1. A method of controlling an electric power system, comprising:
providing a plurality of electric generator resources, each electric generator resource configured to operate in accordance with electric generator resource control data;
providing a plurality of transmission lines, each transmission line coupled to at least one electric generator resource;
providing a plurality of telemetered switching devices, each telemetered switching device coupled to at least one transmission line of the plurality of transmission lines;
providing a plurality of non-telemetered switching devices, each non-telemetered switching device coupled to at least one transmission line of the plurality of transmission lines;
providing an energy management system coupled to the plurality of electric generator resources, the plurality of transmission lines, and at least one telemetered switching device;
generating a first network topology model of the electric power system;
generating a first state estimation based, at least in part, on the first network topology model of the electric power system;
generating a first topology error estimation based, at least in part, on the first state estimation of the electric power system, wherein generating the first topology error estimation includes using a binary variable corresponding to a status of a telemetered or non-telemetered switching device;
generating a second network topology model of the electric power system based, at least in part, on the first network topology model of the electric power system and the first topology error estimation;
generating a second state estimation of the electric power system based, at least in part, on the second network topology model of the electric power system;
determining an optimized schedule of power generation for one or more electric generator resources of the plurality of electric generator resources, based at least in part on the second state estimation;
determining an optimized configuration of one or more transmission lines of the plurality of transmission lines, based at least in part on the second state estimation;
generating electric generator resource control data based, at least in part, on the optimized schedule of power generation;
generating transmission line configuration control data based, at least in part, on the optimized configuration of one or more transmission lines;
managing a generated electric power output level of at least one electric generator resource of the plurality of electric generator resources based, at least in part, on the electric generator resource control data; and
managing a configuration of one or more transmission lines based, at least in part, on the transmission line configuration control data.

2. The method of claim 1, further comprising:
identifying bad data on which at least a portion of the first network topology model is based.

3. The method of claim 1, wherein at least some of the transmission lines of the plurality of transmission lines are high-voltage transmission lines.

4. The method of claim 1, wherein generating the first topology error estimation includes minimizing $J(r)=\frac{1}{2}r^T W r$ subject to $$r=z-h(x),$$

$$c(x)=0, \text{ and}$$

$$d(x,y) \leq 0$$

where
x is an nsv×1 vector of state variables namely $x^T=[\theta^T, v^T, Ps^T, Qs^T]$,
$\theta^T$ is an n×1 vector of node/bus voltage angles,
$v^T$ is an n×1 vector of node/bus voltage magnitudes, Ps is an ns×1 vector of MW flows through switches that are represented in a physical model, Qs is an ns×1 vector of MVAR flows through switches that are represented in the physical model, y is an ns×1 vector of binary variables that correspond to switches that are represented in the physical model, $$y_s = \begin{cases} 1 & \text{if switch } s \text{ is closed} \\ 0 & \text{if switch } s \text{ is open} \end{cases},$$

z is an m×1 vector of measurements, r is an m×1 vector of residuals between the measurements and the estimated value of the measurements, $$W = R_z^{-1} = \begin{bmatrix} \sigma_1^{-2} & \cdots & 0 \\ \vdots & \ddots & \vdots \\ 0 & \cdots & \sigma_m^{-2} \end{bmatrix},$$

W is a diagonal matrix whose elements are the measurement weights and $R_z$ is a measurement covariance matrix, h(x) is an m×1 vector of non-linear functions that express the measurements in terms of the state variables, c(x) is an nec×1 vector function of equality constraints, and d(x,y) is an nic×1 vector function of inequality constraints.

5. The method of claim 4, wherein the inequality constraints include:

$$-y_s M \leq Ps_s \leq y_s M,$$

$$-y_s M \leq Qs_s \leq y_s M,$$

$$-(1-y_s)M \leq (\theta_i - \theta_j) \leq (1-y_s)M, \text{ and}$$

$$-(1-y_s)M \leq (v_i - v_j) \leq (1-y_s)M.$$

6. The method of claim 1, wherein generating the first topology error estimation includes minimizing $J(r) = \frac{1}{2} r^T W r$ subject to $$r = z - h(x),$$

$$c(x) = 0, \text{ and}$$

$$d(x,y) \leq 0$$

where x is an nsv×1 vector of state variables namely $x^T = [\theta^T, Ps^T]$ $\theta^T$ is an n×1 vector of node/bus voltage angles, Ps is an ns×1 vector of MW flows through switches that are represented in a physical model, y is an ns×1 vector of binary variables that correspond to switches that are represented in the physical model, $$y_s = \begin{cases} 1 & \text{if switch } s \text{ is closed} \\ 0 & \text{if switch } s \text{ is open} \end{cases},$$

z is an m×1 vector of measurements, r is an m×1 vector of residuals between the measurements and an estimated value of the measurements, W is a diagonal matrix whose elements are measurement weights, h(x) is an m×1 vector of linear functions that express the measurements in terms of the state variables, c(x) is an nec×1 vector function of equality constraints, and d(x,y) is an nic×1 vector function of inequality constraints.

7. The method of claim 6, wherein the inequality constraints include:

$$-y_s M \leq Ps_s \leq y_s M$$

$$-(1-y_s)M \leq (\theta_i - \theta_j) \leq (1-y_s)M.$$

8. The method of claim 1, further comprising:

operating the at least one electric generator resource so as to modify the generated electric power output level in accordance with the electric generator resource control data.

9. The method of claim 1, further comprising:

configuring the plurality of transmission lines in accordance with the transmission line configuration control data.

10. An electric power system, comprising:

a plurality of electric generator resources, each electric generator resource configured to operate in accordance with electric generator resource control data;

a plurality of transmission lines, each transmission line coupled to at least one electric generator resource;

a plurality of telemetered switching devices, each telemetered switching device coupled to at least one transmission line of the plurality of transmission lines;

a plurality of non-telemetered switching devices, each non-telemetered switching device coupled to at least one transmission line of the plurality of transmission lines; and an energy management system coupled to the plurality of electric generator resources, the plurality of transmission lines, and at least one telemetered switching device, the energy management system comprising:

a processor, a memory, and a plurality of instructions stored in the memory that, when executed by the processor, cause the energy management system to:

generate a first network topology model of the electric power system;

generate a first state estimation of the electric power system based, at least in part, on the first network topology model;

generate a first topology error estimation based, at least in part, on the first state estimation of the electric power system;

generate a second network topology model of the electric power system based, at least in part, on the first network topology model of the electric power system and the first topology error estimation;

generate a second state estimation of the electric power system based, at least in part, on the second network topology model of the electric power system;

determine an optimized schedule of power generation for one or more electric generator resources of the plurality of electric generator resources, based at least in part on the second state estimation;

determine an optimized configuration of one or more transmission lines of the plurality of transmission lines, based at least in part on the second state estimation;

generate electric generator resource control data based, at least in part, on the optimized schedule of power generation;
generate transmission line configuration control data based, at least in part, on the optimized configuration of one or more transmission lines;
manage a generated electric power output level of at least one electric generator resource based, at least in part, on the electric generator resource control data; and
manage a configuration of one or more transmission lines based, at least in part, on the transmission line configuration control data;
wherein the instructions that, when executed by the processor cause the energy management system to generate a first topology estimation of the electric power system further cause the energy management system to include binary variables corresponding to a status of one or more of the telemetered or non-telemetered switches.

11. The electric power system of claim 10, wherein the instructions stored in the memory, when executed by the processor, further cause the energy management system to:
identify bad data on which at least a portion of the first network topology model is based.

12. The electric power system of claim 10, wherein at least some of the transmission lines of the plurality of transmission lines are high-voltage transmission lines.

13. The electric power system of claim 10, wherein the instructions stored in the memory, when executed by the processor, further cause the energy management system to:
generate the first topology error estimation by minimizing $J(r)=\frac{1}{2}r^T Wr$ subject to $$r=z-h(x),$$

$$c(x)=0, \text{ and}$$

$$d(x,y) \le 0$$

where
x is an nsv×1 vector of state variables namely $x^T=[\theta^T, v^T, Ps^T, Qs^T]$,
$\theta^T$ is an n×1 vector of node/bus voltage angles,
$v^T$ is an n×1 vector of node/bus voltage magnitudes,
Ps is an ns×1 vector of MW flows through switches that are represented in a physical model,
Qs is an ns×1 vector of MVAR flows through switches that are represented in the physical model,
y is an ns×1 vector of binary variables that correspond to switches that are represented in the physical model, $$y_s = \begin{cases} 1 & \text{if switch } s \text{ is closed} \\ 0 & \text{if switch } s \text{ is open} \end{cases},$$

z is an m×1 vector of measurements,
r is an m×1 vector of residuals between measurements and an estimated value of those measurements, $$W = R_z^{-1} = \begin{bmatrix} \sigma_1^{-2} & \cdots & 0 \\ \vdots & \ddots & \vdots \\ 0 & \cdots & \sigma_m^{-2} \end{bmatrix},$$

W is a diagonal matrix whose elements are measurement weights and $R_z$ is a measurement covariance matrix,
h(x) is an m×1 vector of non-linear functions that express the measurements in terms of state variables,
c(x) is an nec×1 vector function of equality constraints, and
d(x,y) is an nic×1 vector function of inequality constraints.

14. The electric power system of claim 13, wherein the inequality constraints include:

$$-y_s M \le Ps_x \le y_x M,$$

$$-y_s M \le Qs_s \le y_s M,$$

$$-(1-y_s)M \le (\theta_i - \theta_j) \le (1-y_s)M, \text{ and}$$

$$-(1-y_s)M \le (v_i - v_j) \le (1-y_s)M.$$

15. The electric power system of claim 10, wherein the instructions stored in the memory, when executed by the processor, further cause the energy management system to:
generate the first topology error estimation by minimizing $J(r)=\frac{1}{2}r^T Wr$ subject to $$r=z-h(x),$$

$$c(x)=0, \text{ and}$$

$$d(x,y) \le 0$$

where
x is an nsv×1 vector of state variables namely $x^T=[\theta^T, Ps^T]$
$\theta^T$ is an n×1 vector of node/bus voltage angles,
Ps is an ns×1 vector of MW flows through switches that are represented in a physical model,
y is an ns×1 vector of binary variables that correspond to switches that are represented in the physical model, $$y_s = \begin{cases} 1 & \text{if switch } s \text{ is closed} \\ 0 & \text{if switch } s \text{ is open} \end{cases},$$

z is an m×1 vector of measurements,
r is an m×1 vector of residuals between measurements and an estimated value of those measurements,
W is a diagonal matrix whose elements are measurement weights,
h(x) is an m×1 vector of linear functions that express measurements in terms of the state variables,
c(x) is an nec×1 vector function of equality constraints, and
d(x,y) is an nic×1 vector function of inequality constraints.

16. The electric power system of claim 15, wherein the inequality constraints include:

$$-y_s M \le Ps_s \le y_s M$$

$$-(1-y_s)M \le (\theta_i - \theta_j) \le (1-y_s)M.$$

17. The electric power system of claim 10, wherein the instructions stored in the memory, when executed by the processor, further cause the energy management system to:
operate the at least one electric generator resource so as to modify the generated electric power output level in accordance with the electric generator resource control data.

18. The electric power system of claim 10, wherein the instructions stored in the memory, when executed by the processor, further cause the energy management system to:

configure the plurality of transmission lines in accordance with the transmission line configuration control data.

19. The electric power system of claim 10, wherein the instructions stored in the memory, when executed by the processor, further cause the energy management system to:
represent a first portion of the electric power system at a switch/node level; and
represent a second portion of the electric power system at a bus/branch level.

20. The electric power system of claim 10, wherein the instructions stored in the memory, when executed by the processor, further cause the energy management system to:
form disjoint sets of constraints based, at least in part, on the binary variables corresponding to the status of one or more of the telemetered or non-telemetered switches.

* * * * *